Feb. 19, 1935.  E. E. WEMP  1,991,436
VIBRATION DAMPENER
Filed June 16, 1931
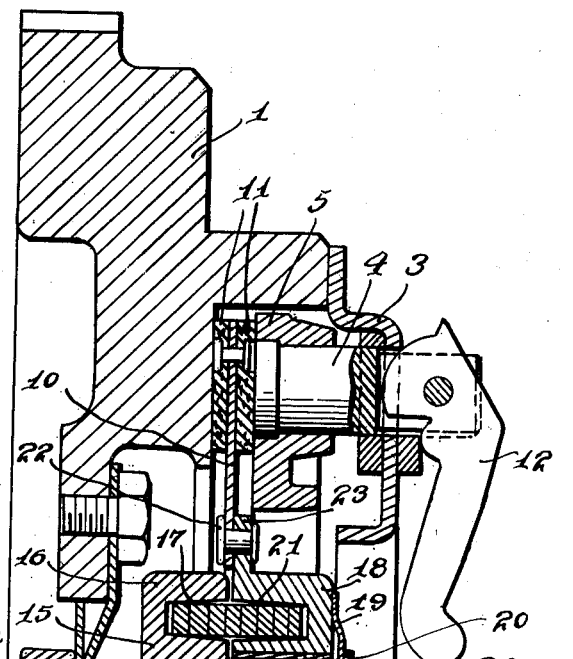
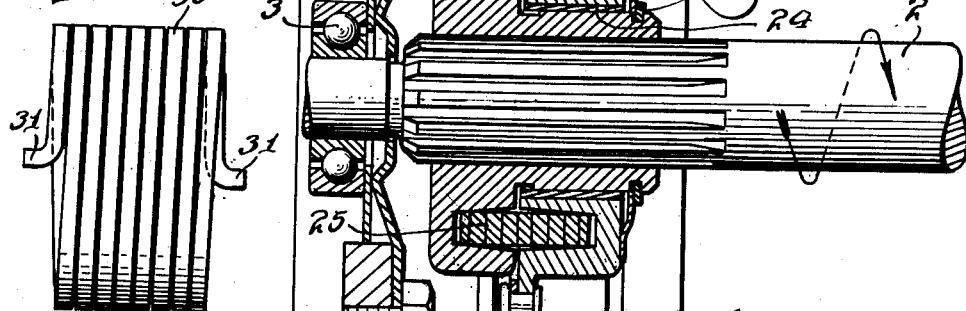
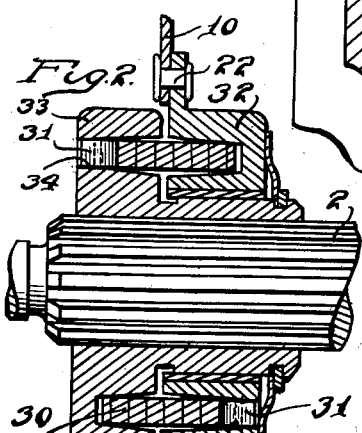
INVENTOR.
ERNEST E. WEMP.
BY
Barnes and Kisselle
ATTORNEYS.

Patented Feb. 19, 1935

1,991,436

UNITED STATES PATENT OFFICE 1,991,436

VIBRATION DAMPENER

Ernest E. Wemp, Detroit, Mich.

Application June 16, 1931, Serial No. 544,812

8 Claims. (Cl. 192—68)

This invention relates to a vibration dampener such as may be employed in mechanism for transmitting power from an engine to parts driven thereby. One advantageous environment for the invention is an automotive vehicle wherein the vibration dampener may be associated with mechanism transmitting the power from the engine to the propelling wheels. Internal combustion engines which are used in automotive vehicles are subject to vibration, and by placing the dampener construction in the line of power transmission the engine vibrations are not only dampened but the dampener also serves to keep the vibrations from being telegraphed to other chassis parts.

While the invention is not limited to automotive vehicles, such is an advantageous environment and accordingly such environment has been selected for showing and describing the invention herein. An object of the invention is to provide an improved dampener construction capable of permitting relative movement between two parts, one of which drives the other, and at the same time providing in itself an effective safe, driving connection between these parts.

In the drawing:

Fig. 1 is a sectional view taken through a clutch construction showing the vibration dampener arrangement.

Fig. 2 is a sectional view taken through a structure illustrating a modified form.

Fig. 3 is a view of a coil spring of the modified form.

In the accompanying drawing there is shown the flywheel of an engine 1 which, together with other parts comprises driving members of a clutch. A driven shaft shown at 2 may be journaled in the flywheel as by an anti-friction bearing 3ª. The vibration dampener construction may be advantageously located in the clutch and arranged to communicate driving action as between flywheel 1 and driven shaft 2.

Mounted upon the flywheel may be a cover plate 3 carrying studs 4 which in turn support a clutch pressure ring 5. A suitable number of packing springs 6 may be packed up by cups 7 carried by the cover plate and acting upon the pressure ring 5. The pressure ring and the opposing face portion of the flywheel are arranged to pack between them, by action of springs 6, a driven member of the clutch which may be in the form of a disk 10 provided with clutch facing material 11. For releasing the clutch one or more levers 12 may be provided, which, when rocked in a manner which is clockwise for the lever shown in Fig. 1, retract the plungers 4 and the pressure ring 5 against the action of packing springs 6 to free the driven member. The mechanism so far described is subject to considerable variation and in reality constitutes a more or less conventional type of clutch, and its operation is well understood by those versed in the art.

The vibration dampener arrangement may be incorporated in the driven member of the clutch. Accordingly, it is so shown. The driven disk 10 is provided with a hub portion which unites it to the shaft 2. Such a hub portion may comprise a hub member 15 which may be attached to shaft 2 by the usual spline connection. This member 15 has a radially extending flange like portion 16 which is provided with a circular recess 17. Rotatably mounted relative to member 15 is a second hub like member 18. This member 18 may be mounted directly upon a portion of hub member 15 with a bearing 24 interposed between them. For maintaining the members 15 and 18 assembled a spring ring 19 may be employed backed up by a locking ring 20 which is seated in a groove of the member 15. The spring ring 19 may be offset, as shown, so as to exert a pressure tending to force member 18 toward the portion 16 of the member 15.

The hub member 18 has a recess 21, circular in formation, and which faces recess 16. Disposed in the facing recesses is a coil spring 25. The driven disk 10 is secured to the member 18 as by means of rivets 22 passing through member 10 and a flange 23 on the member 18.

This coil spring is designed to be energized into frictional contact with the walls of the recesses establishing a drive connection between the members 18 and 15. For this purpose the walls of the recesses 17 and 21 may be disposed at an angle to the axis so that the recesses are wider at their mouth with the width decreasing with depth. With this arrangement the spring may be disposed in the recesses so that opposite ends of the spring, say for example, the convolutions at each end, are frictionally gripped by the walls of the recesses. The spring tendency of washer 19 may urge the members 18 and 15 toward each other to the end that the inclined walls of the recesses engage the end convolutions of the spring. In such a construction it is advantageous that when the spring ends are seated in the recesses and engaged by the walls they are not yet flush against the bottom of the recesses as shown. The inclination of the walls of the recesses may be only very slight, but for the sake of clearness of disclosure this is shown in an exaggerated manner in the drawing.

In the operation of the construction the flywheel and the other driving parts of the clutch may normally rotate in the direction of the arrow. When the clutch is engaged the driving members of the clutch rotate the driven disk 10 in a manner well known to those versed in the art. This tends to rotate member 18 which however is journaled on bearing 24. Due to the fact that the ends of the spring are frictionally engaged with members 18 and 15, relative movement between members 18 and 15 tend to unwind or wind up the convolutions of the spring; this results in an expansion and contraction of the spring, respectively, depending upon the direction of the applied torque. When the driving members rotate in the direction of the arrow, then, assuming that the spring 25 is of left hand winding, the spring 25 expands in its unwinding action with the result that the convolutions thereof progressively from its ends toward the center come into frictional contact with the outer circular walls of the recesses 17 and 21 thus establishing a frictional driving connection between the two hub parts. If the driven shaft 2 tends to overrun the driving parts, then member 15 tends to drive member 18. This reverses the applied torque and causes the spring to wind up or contract to the end that its convolutions progressively from its ends toward its central portion frictionally engage the inner peripheral walls of the recesses to establish a frictional drive between the two hub parts.

The efficiency of the frictional engagement of such a spring with rotating parts is known to those versed in the art, and with each additional convolution the frictional engagement substantially squares itself. Accordingly, an effective drive connection is provided between the two hub parts. The gripping effect also depends upon the coefficient of friction which may be determined by the materials involved, the length of the circular arc in contact with the spring and the radius of the frictionally engaged surface. It is preferable therefore that the spring be arranged so as to expand and frictionally engage the outer circumferential walls of the recesses when the clutch driving parts are driving the driven parts as this increases the radius and the length of the circular arc with which the spring contacts. If the normal driving direction is in the direction shown by the arrow, then it is advantageous that the spring be of left hand winding so as to expand and engage the outer circumferential walls in normal driving condition.

It will be obvious that due to this arrangement relative rotation may take place as between the two hub members, or in other words, between the clutch driving parts and the driven shaft 2. This relative movement may be slight and the amount of such relative movement may vary with the inclination of the recess walls, as the inclination of the recess walls in part determine the extent of expansion and contraction of the spring to establish frictional engagement with the outer and inner walls, respectively. Accordingly, when vibration takes place, as for example in an internal combustion engine, of which member 1 is the flywheel, there may be a slight oscillating tendency as between the flywheel 1 and the clutch parts including hub portion 18 relative to the shaft 2 and hub portion 15. This is permitted by reason of the spring permitting such relative rotational motion. Some measure of friction occurs upon such relative rotation set up by vibrations, for upon the expanding and contracting of the spring the adjacent convolutions of the spring slide upon each other, and it will be noted that the spring convolutions are held compactly together by the member 19. Thus not only does the spring permit of an oscillating tendency for the clutch parts relative to the shaft 2, but it also affords a measure of retarding friction tending to dampen out these vibrations.

It is observed that the arrangement of the spring 25 is such, in association with its recesses, as to establish a driving connection between the two hub parts, regardless of which hub part tends to drive the other so that the construction does not afford what may be termed an overrunning clutch, but merely an intermediate clutch arrangement designed to permit some relative movement as between some of the power transmitting parts.

In the modified form the spring is arranged for positive connection with the two hub parts. This may be accomplished by securing the ends of the springs to the respective hub members. As shown in Fig. 3 a coil spring 30 may have its ends turned out as at 31. The recessed hub members 32 and 33 may be provided with apertures 34 extending through the bottom of the recesses into which the spring ends 31 fit. The circular recesses in the hub members 32 and 33 may also be of tapering wall construction, as shown.

This construction establishes a definite connection between the two hub parts and the spring ends and is advantageous from the standpoint of permitting more tolerance as between dimensions of the recess walls and spring. In other words, where a purely frictional contact is employed, as shown in Fig. 1, close tolerances are required, necessitating accurate and close machining of the recesses and the spring, whereas in the modified form with the spring ends definitely tied to the hub parts, greater tolerances may be permitted.

I claim:—

1. In a vibration dampener, the combination of two members rotatable with respect to each other, a circular recess in each member with the recesses facing each other, a coil spring disposed in the recesses and adapted to expand and contract in accordance with the direction of the applied torque to frictionally engage the outer and inner circumferential walls of the recesses, respectively, the width of the recesses gradually decreasing with depth, and the end convolutions of said spring being tightly engaged in the narrower bottom portions of the recesses.

2. In a vibration dampener, the combination with a driven shaft, a hub member mounted upon the shaft to drive the same and having a circular recess, another hub member rotatably mounted relative to the shaft having a circular recess facing the circular recess of the first mentioned hub member, means for rotating the second named hub member, and a coil spring disposed in the recesses, the width of the recesses gradually decreasing with depth, and the end convolutions of the spring being frictionally engaged with the walls of the recesses in their narrower bottom portions.

3. In a vibration dampener, the combination with a driven shaft, a hub member mounted upon the shaft to drive the same and having a circular recess, another hub member rotatably mounted relative to the shaft having a circular recess facing the circular recess of the first mentioned hub member, means for rotating the second named hub member, and a coil spring disposed in the recesses, the width of the recesses gradually decreasing with depth, and the end convolutions of the spring being frictionally engaged with the walls of the recesses in their narrower bottom portions, and means for urging the hub members toward each other to maintain the end convolutions of the spring in frictional engagement with said walls.

4. The combination with a shaft, a hub member mounted on the shaft to drive the same, said hub member having a radially extending part with a circular recess, and having an axially extending part, another hub member journaled on the axially extending part of the first mentioned hub member and having the circular recess facing the recess of the other hub member, the width of the recesses gradually decreasing with depth, a coil spring disposed in the recesses, the end convolutions of which are in frictional contact with the walls of the recesses in their narrow bottom portions, spring means for urging the hub members toward each other to maintain such frictional engagement, and means for rotating the second named hub member.

5. In a vibration dampener, the combination of two members rotatable with respect to each other, a circular recess in each member with the recesses facing each other, a coil spring disposed in the recesses and adapted to expand and contract in accordance with the direction of the applied torque to frictionally engage the outer and inner walls of the recesses, respectively, the ends of the spring being disposed in a projecting manner, and the two rotatable members each having a recess or the like for the reception of a projecting spring end, the width of the recesses decreasing substantially uniformly with depth so that the bottom of the recesses substantially fit the end convolutions of the spring.

6. A driven clutch disk adapted to be engaged by driving members, a hub element adapted to be secured to a driven shaft, said hub element including an axially extending bearing portion and a radially extending portion, said radially extending portion having an annular recess therein with outside and inside annular walls, another hub element, means connecting the same to the driven disk, said other hub element being journaled upon the axially extending bearing portion of the first mentioned hub element, said other hub element having an annular recess with outside and inside annular walls, said recesses being disposed in facing relation, and a coil spring housed in the facing recesses having its ends engaged with the two hub elements respectively, said coil spring being adapted to expand and contract in accordance with the direction of applied torque to frictionally engage the outer and inner recess walls, respectively and provide a normal frictional drive connection between the hub elements.

7. In a vibration dampener, the combination of two members rotatable with respect to each other, a circular recess in each member with the recesses facing each other, a coil spring disposed in the recesses and adapted to expand and contract in accordance with the direction of applied torque to frictionally engage the outer and inner circumferential walls of the recesses, respectively, said recesses having substantially uniformly tapering walls and a width near the bottom of the recesses less than the width near the mouth of the recesses, and the end portions of said spring each having a connection with the respective members whereby rotation of either member relative to the other tends to expand or contract the spring.

8. A clutch driven member comprising a driven disc, a hub member connected thereto and having a circular annular recess, another hub member adapted to be connected in driving relation to a driven shaft, said other hub member having a circular annular recess facing the said recess in the first mentioned hub member, said hub members being free to rotate relative to each other, and a coil spring disposed in said facing recesses and adapted to expand and retract to engage respectively the outer and inner circumferential walls of the recesses in accordance with the direction of applied torque, said coil spring being of such strength as to normally be expanded or retracted to normally provide a frictional driving connection between the said hub members, and spring means for constantly urging the said hub members toward each other and applying pressure on the coil spring.

ERNEST E. WEMP.